United States Patent [19]
Belle

[11] Patent Number: 6,015,132
[45] Date of Patent: Jan. 18, 2000

[54] SPEAKER SADDLE

[76] Inventor: Michael J. Belle, 4410 Chimney Creek Dr., Sarasota, Fla. 34237

[21] Appl. No.: 08/977,224

[22] Filed: Nov. 24, 1997

[51] Int. Cl.[7] ....................................................... F16M 3/00
[52] U.S. Cl. .................. 248/683; 248/442.2; 248/205.3; 248/918
[58] Field of Search ................................ 248/682, 442.2, 248/683, 690, 205.3, 918

[56] References Cited

U.S. PATENT DOCUMENTS

| | | | |
|---|---|---|---|
| 4,706,914 | 11/1987 | Ground | 248/205.3 |
| 5,082,235 | 1/1992 | Crowther et al. | 248/442.2 |
| 5,125,612 | 6/1992 | McNeal | 248/918 |
| 5,499,793 | 3/1996 | Salansky | 248/442.2 |
| 5,639,060 | 6/1997 | Spoonts | 248/683 |
| 5,683,070 | 11/1997 | Seed | 248/442.2 |

*Primary Examiner*—Ramon O. Ramirez
*Attorney, Agent, or Firm*—Dorothy S. Morse

[57] ABSTRACT

An adjustable, reusable device and method for suspending computer accessories, such as audio speakers, against the upper side surfaces of computer monitors and CPU tower housings. The present invention comprises a support strap made from a flat, durable, flexible, but non-stretchable material; two connecting rings, a first connecting ring located proximal to the first end of the support strap and the second connecting ring located proximal to the second end of the support strap, the rings providing the ability to create loops in the support strap into which accessories can be inserted and secured for use or storage above the work surface upon which the computer monitor or CPU tower housing is placed; and the device also comprising two fasteners, the first fastener located proximal to the first end of the support strap and the second fastener located proximal to the second end of the support strap. Each fastener is engaged once a computer accessory is inserted into the support strap loop adjacent thereto to further secure the accessory within the loop. Once the accessories are thus secured, the center portion of the support strap is placed upon the forward top surface of a computer monitor or CPU tower housing, allowing the accessories to rest in a substantially vertical position essentially flush against the upper side surfaces of the computer housings. The device can be adjusted to accommodate various sizes and configurations of accessories and computer housings.

15 Claims, 2 Drawing Sheets

SPEAKER SADDLE

BACKGROUND

1. Field of Invention

This invention relates to mounting devices for computer accessories, specifically to an adjustable, reusable device, and a method for its use, for securing computer accessories, such as audio speakers, in a suspended, out-of-the-way position against the upper side surfaces of computer monitors and computer central processing unit tower housings so as to free the work space around the base of monitors and tower housings for other uses.

2. Description of Prior Art

As personal computers have recently become a more common and important part of peoples' lives, both in the work place and at home, the computer support equipment and accessory industries have responded by providing computer operators with an increasing variety of add-on devices to enhance their computer use. Support equipment and accessories, such as audio speakers, external modems, external disk drives, external CD-ROM drives, external ZIP drives, video conferencing cameras, and microphones now clutter the work-space of many computer operators and interfere with their work efficiency.

X Prior art devices are known which help to clear the work space of computer operators by providing them with a means for attaching accessories to their computer monitors, rather than leaving the accessories on the desktop surface adjacent to the monitor. There are several known computer accessory mounting devices which are rigid, such as the invention disclosed in U.S. Pat. No. 5,639,060 to Spoonts (1997). The Spoonts invention comprises a bracket for mounting an audio speaker to a standard computer monitor and has a upper section to engage the upwardly facing surface of a computer monitor, a side section downwardly depending therefrom which is engageable with the side surface of the monitor, and a lower platform which extends transversely from bottom of the side section and supports the speaker. The Spoonts invention also contemplates the use of pieces of adhesive tape to connect the upper and side sections to the outside surface of the monitor housing. Use of adhesive tape has several disadvantages. The device cannot be secured to the computer monitor without it. Also, it is not easily reusable, since the adhesive tape typically used with the mounting devices only effectively secures the device in place during its first use. If subsequent uses are attempted, the device can become detached from the computer housing surface over time. Also, replacement adhesive tape of sufficient strength to securely attach the devices in place is not always readily available for purchase. Additionally, when removed from the surface of the computer monitor, the adhesive tape frequently leaves behind an unsightly and sticky residue which is difficult to remove. Other prior art mounting devices are known which integrate computer accessories, such as audio speakers, into modules that are placed around the computer monitor. One disadvantage of these devices is that they are more expensive than the present invention, and they can only be used with specific sizes of accessories and i monitors, not allowing computer operators the flexibility provided by the present invention of being adapted for use with almost any size or type of accessory and monitor currently available.

The prior art thought to be most closely related to the present invention is disclosed in U.S. Pat. No. 5,683,070 to Seed (1997). The Seed invention discloses an inverted U-shaped bracket having a rectangular framework of substantially the same dimension as the front face of the computer monitor upon which it will be supported. The bracket comprises laterally positioned grooved channels which cooperate with accessories or brackets having a lateral flange of substantially the same thickness as the grooved channels. The Seed invention is limited in its use to a particular size of computer monitor and accessories having lateral flanges for attachment to the grooved channels in the bracket fitting over the top surface of the monitor. In contrast, the present invention helps to solve the problem of desktop clutter caused by the use of multiple pieces of computer support equipment and accessories with a computer system, by providing a simple, reusable, and adjustable device which is lower in cost to manufacture than the Seed invention, that allows at least two similarly weighted pieces of external computer equipment or accessories to be suspended in an out-of-the-way position against the upper side surfaces of a computer monitor without having to attach lateral flanges to the accessories. The present invention comprises a durable, flexible, but non-stretchable, elongated support strap, two connecting rings, and fastening means to secure the ends of the strap to an adjacent portion of the strap. It is easy to use and requires no complex or time consuming installation. Although not critical, in the preferred embodiment it is contemplated for the connecting rings to have an oval configuration and for the fastening means to comprise at least two hook-and-loop type of fasteners. During use, the ends of the strap are each wrapped tightly around a different computer accessory or combination of accessories. Initially, when needed for use, each end of the support strap is inserted through one of the connecting rings. Then the strap end is drawn back through the connecting ring a second time to form a loop in the end portion of the strap. At least one computer accessory is then placed within the loop, after which the end of the strap is pulled to tighten the strap around the perimeter of accessory or accessories positioned within the loop. The end of the strap extending beyond the connecting ring identified hereinafter as a flap extension, is then attached with fastening means to an adjacent portion of the strap to prevent inadvertent loosening of the loop over time. The strap, with accessories attached thereto, is then draped across the forward top surface of the computer monitor to hold the accessories in a substantially vertical position flush against the upper side surfaces of the computer monitor in an easily accessed but out-of-the-way position above the work surface of the computer operator. The downward force of gravity causes the similarly weighted computer accessories to be indefinitely suspended in a balanced and stable position against the sides of the monitor. When the suspended accessories are not completely balanced in weight, a high friction pad centrally positioned between the lower surface of the strap and the monitor can be used to help hold the accessories in a desired position without the weight disparity therein causing the heavier accessory to unseat the strap from the top of the monitor. Although contemplated for use with computer monitors and accessories of varying sizes and configurations, it is also contemplated for the present invention to be used to suspend accessories from the upper surfaces of a computer's CPU tower housing. Thus, the present invention is distinguishable from the Seed invention in many different ways.

SUMMARY OF INVENTION—OBJECTS AND ADVANTAGES

The primary object of this invention is to provide a quick, easily installed and removed, reusable means for mounting computer accessories, such as audio speakers, in an easily accessed but out-of-the-way position against the upper side surfaces of a computer monitor to free the work space around the base of the monitor for other uses. A further object of this invention is to provide a device that can accommodate computer monitors and external accessory devices of differing sizes and configurations. It is also an object of this invention to provide a means for mounting computer accessories to the upper side surfaces of a computer monitor which is light in weight and does not cause damage to the computer monitor during use or upon removal therefrom. A further object of this invention to provide a means for supporting speakers and other computer accessories above the desktop surfaces of computer operators to increase the work space available to them to enhance their work efficiency. It is also an object of this invention to enhance the sound quality of computer speakers by raising them to the ear level of the computer operator. A further object of this invention is to provide an accessory mounting device which has a configuration that permits compact storage when the device is not needed for use. It is also an object of this invention to provide a means for mounting speakers and other accessories to the upper side surfaces of a computer monitor that is simple to use, made of durable materials, and inexpensive to manufacture so as to promote cost-effective home use thereof.

As described herein properly manufactured and used, the present invention would provide a reusable, lightweight, and adjustable means for mounting different sizes of computer accessories against the upper side surfaces of a computer monitor thus freeing the amount of desktop work space available to a computer operator. In the alternative, the present invention can be used to suspend accessories, such as but not limited to speakers, back-up tapes, and various external drives, from CPU tower housings to have them close at hand so as to be readily available for use. Since nothing is permanently attached to the monitor or CPU tower housing during use, the present invention will not cause any alteration or damage to the housing upon which it is positioned. The present invention comprises an elongated, flexible support strap which is made from non-stretchable material. The present invention also comprises at least two fasteners and two connecting rings positioned near to each end of the strap during use. Although not critical, the present invention may further comprise a high friction pad attached centrally to the surface of the strap in contact with the computer monitor to keep the strap in place on monitors having rearwardly sloping upper surfaces and when the weights of the suspended accessories are not sufficiently similar for optimum balance. To set up the present invention for use, each end portion of the support strap would be positioned to encircle the perimeter of one of a pair of approximately equally weighted computer accessories, such as audio speakers. The ends of the support strap would each be inserted twice through one of the connecting rings to form a loop. The accessory would be placed within the loop and the end of the strap pulled to tighten the loop around the perimeter of the accessory. Fasteners would then be used to attach each end of the support strap to an adjacent portion thereof, thus ensuring that the accessories will remain tightly secured within the loop during use. For ease of installation the connecting ring could be stitched to the support strap so that the portion of the strap material between the connecting rings approximates the width dimension of the upper front surface of the computer monitor. Without the stitching to secure the connecting rings into a fixed position on the support strap, additional adjustment of the support strap around the accessories may be required for optimum positioning of the speakers against the upper side surfaces of a computer monitor. Once the computer accessories are thus secured, the central portion of the support strap is placed across the forward top surface of a computer monitor or CPU tower housing so that the computer accessories rest securely against the upper side surfaces of the computer monitor or CPU tower housing. Audio speakers would thus be placed in positions closer to the ears of the computer operator for enhanced sound quality. Since the present invention can be instantaneously lifted away from the computer monitor at any time, it is simple to use, it is easy to install and remove, it is easily adaptable to fit monitors and accessories of varying sizes and configurations, and it is readily available for reuse upon demand. Since the present invention is made from flexible material, it can easily be rolled or folded into a compact configuration for storage. Also, due to its simple construction, it can be inexpensively manufactured for widespread use. It is contemplated for the strap of the present invention to be made from a lightweight, durable, non-scratching material, such as polypropylene webbing, so that the present invention will not damage the computer equipment with which it is being used.

The description herein provides the preferred embodiment of the present invention but should not be construed as limiting the scope of the speaker saddle invention. For example, variations in the length, width, and thickness of the support strap; the type of fastening means used; the number of fastening means used; the length, width, and thickness of the high friction pad used; and the type of materials used for the support strap and the high friction pad; other than those shown and described herein may be incorporated into the present invention. Thus the scope of the present invention should be determined by the appended claims and their legal equivalents, rather than the examples given.

DETAILED DESCRIPTION OF PREFERRED EMBODIMENTS

Figure 1:
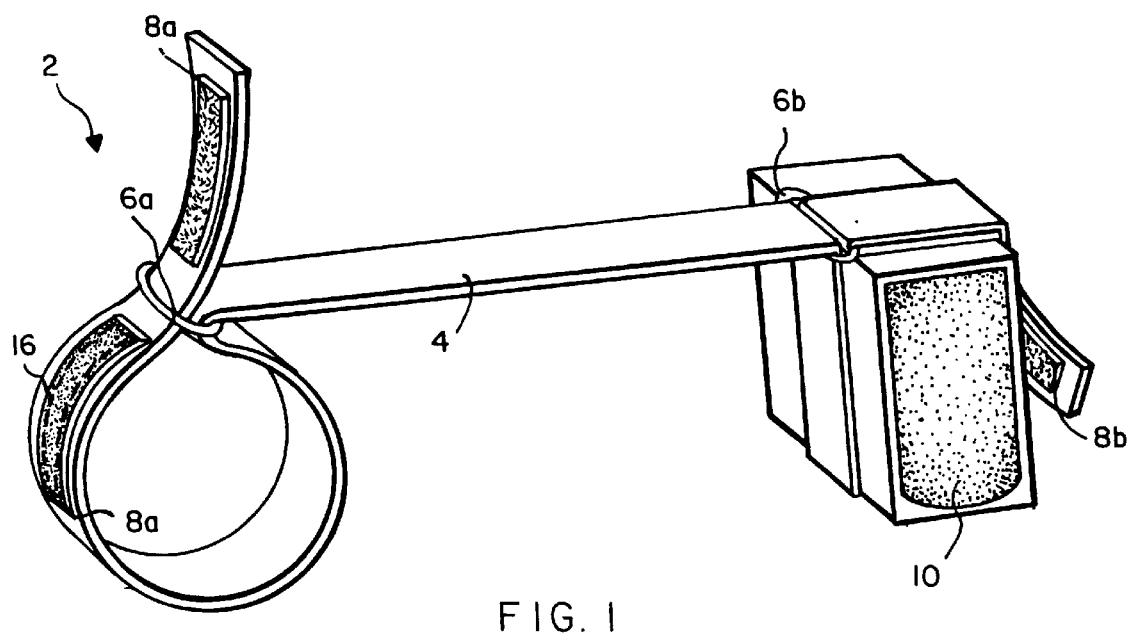
FIG. 1 is a perspective view of the present invention with a computer accessory secured within a loop provided on one end of the support strap.

FIG. 1 shows a preferred embodiment of a computer accessory mounting device 2 with one computer accessory 10 secured therein. As shown in FIG. 1, the preferred embodiment of the present invention comprises an elongated support strap 4, two connector rings 6a and 6b through each of which support strap 4 is twice inserted, and two fasteners 8a and 8b. Although FIG. 1 also shows fasteners 8a and 8b each comprising two elongated cooperating strips of hook-and-loop type of fastener, the number and type of fastener used for fasteners 8a and 8b is not critical to computer accessory mounting device 2. Therefore, it is also contemplated for fasteners 8a and 8b to comprise other fastening means, such as snaps, and for fasteners 8a and 8b to each comprise more than one hook-and-loop type of fastener, or a mixed combination of fastening devices. FIG. 1 shows a first portion of each fastener 8a and 8b attached near to one of the ends of support strap 4, with the cooperating second portions of fasteners 8a and 8b, respectively attached to the same surface of support strap 4 at a spaced distance from the first portions. FIG. 1 shows stitching 16 attaching fasteners 8a and 8b to support strap 4, however, the use of stitching 16 is also not critical to computer accessory mounting device 2. For example, in addition to stitching 16, it is also contemplated for hook-and-pile fasteners 8a and 8b to be attached to support strap 4 with a variety of chemical bonding agents. Further, although not critical, in the preferred embodiment it is contemplated for the width dimension of hook-and-loop fasteners 8a and 8b to be nearly as large as the width dimension of support strap 4. Additionally, FIG. 1 shows one end portion of support strap 4 centrally secured around the top, bottom, and sides of an accessory 10 to put accessory 10 in an optimally supported and stable position for use, while its other end forms a large loop ready for installment of a second accessory 10.

In the preferred embodiment it is contemplated for support strap 4 to be constructed from a lightweight, durable, non-stretchable, flexible material, such as polypropylene webbing. The color of the material used for support strap 4 is not critical and support strap 4 may be made from a variety of solid color and multi-colored materials. It is also preferred that support strap 4 be made from a textured material to prevent slippage, but it must be non-scratching material so that it does not mar the surface of the housing with which it is in contact during use, such as that of computer monitor 12 shown in FIG. 2 or CPU tower 18 shown in FIG. 3. Although the length of support strap 4 is not critical, it must be sufficient to span the top surface of a computer monitor, encircle the perimeter of the size of the accessory 10 requiring suspension, and provide a sufficient length of end flap extending beyond connecting ring 6a or 6b for secure attachment of respective fastener 8a or 8b, so that the loop in the end portion of support strap 4 can be tightly maintained around the accessory for the entire duration of intended use. The width dimension of support strap 4 is also not critical, however, it must be sufficient to provide support strap 4 with the strength necessary to suspend the full weight of two or more accessories 10, such as the audio speakers shown in FIG. 2 or the external drive and two back-up tapes shown in FIG. 3. In the preferred embodiment, it is contemplated for the width dimension of support strap 4 to range between one-and-one-half inches and three inches, with a most preferred width dimension of two inches. Also, by way of example, for a fifteen inch diagonal computer monitor 12 and audio speaker accessories 10 having respective width and height dimensions of four inches and six-and-one-half inches, it is contemplated for the length dimension of support strap 4 to range between approximately seventy and eighty inches. To accommodate a two inch wide support strap 4, in the most preferred embodiment connecting rings 6a and 6b would each have a two inch long and three-eighths of an inch wide center opening through which support strap 4 can be inserted. Since computer monitors 12 commonly range in dimension between fourteen and twenty inches, measured diagonally, it is contemplated for the present invention to comprise two independent embodiments, a first embodiment with a longer support strap 4 for use with larger computer monitors 12 measuring between seventeen and twenty inches, and a second embodiment with a shorter support strap 4 for use with smaller computer monitors 12 measuring between fourteen and seventeen inches, diagonally. The smaller support strap 4 would be approximately three inches shorter than the larger support strap 4. It is also within the scope of the present invention to have a support strap 4 that has a length dimension even shorter than the smaller computer monitor support strap 4 for use with CPU tower housings 18.

During use, with one end of support strap 4 inserted twice though a connecting ring, such as connecting rings 6a and 6b, to form a loop for support of an accessory 10, such as an audio speaker, connector rings 6a and 6b are positioned on support strap 4 a little more than one-third of the length in from its adjacent end of support strap 4. Also, although not critical, it is contemplated for ring connectors 6a and 6b to have an oval shape, with one opening therethrough, and to be made from plastic or metal materials. In the alternative, connecting rings 6a and 6b may have a central bar thereacross, providing two openings for insertion therethrough of support strap 4 such as cross bar 20 in FIG. 5. To keep connecting rings 6a and 6b in a pre-determined position on support strap 4, for increased ease of use, support strap 4 may be inserted once through connecting ring 6a or 6b, folded back on itself and secured by stitching 16 placed across both layers of support strap 4 approximately three-fourths of an inch from the fold. Subsequent adjustment of support strap 4 around accessories 10, after support strap 4 is initially pulled tight around accessory 10, is reduced by such use of stitching 16.

Figure 2:
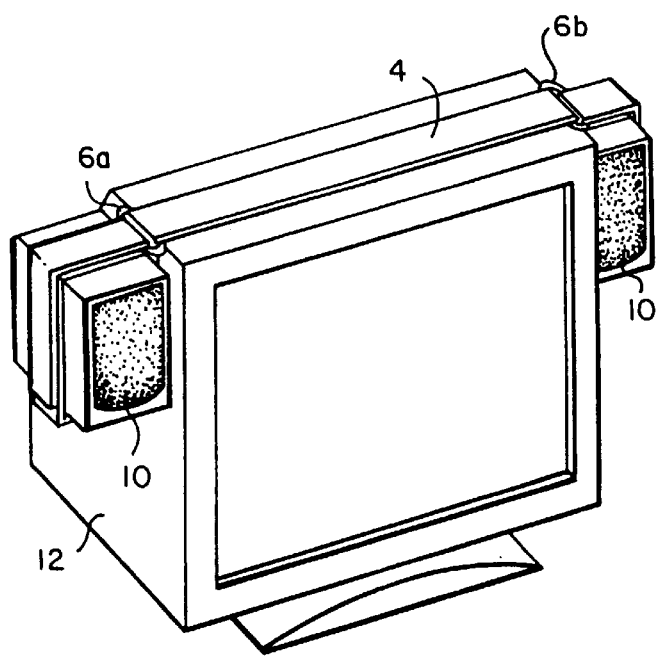
FIG. 2 is a perspective view of the present invention supporting two computer accessories of similar weight, each secured within a loop provided on one of the opposite ends of the support strap, and positioned across the top surface of a computer monitor so that each accessory is suspended against one of the upper side surfaces of the computer monitor.

FIG. 2 shows computer accessory mounting device 2 in use, supported across the forward top surface of computer monitor 12 by the center portion of support strap 4. The first end of support strap 4 encircles a first computer accessory 10 and feeds twice through a first connector ring 6a to support first computer accessory 10 within the first end portion of support strap 4. Although not shown in FIG. 2, first fastener 8a is engaged between the first flap "extension, identified as number 22a in FIG. 4," of support strap 4 and the remainder of support strap 4 to tightly secure first accessory 10 within a loop formed in support strap 4. The second end of support strap 4 encircles a second computer accessory 10 and feeds twice through a second connector ring 6b to support second computer accessory 10 within the second end portion of support strap 4. Although not shown in FIG. 2, second fastener 8b is engaged between the second flap "extension, identified as number 22b in FIG.4," of support strap 4 and the remainder of support strap 4 to tightly secure second accessory 10 within a loop formed in support strap 4. Although not critical, for maximum contact between accessories 10 and computer monitor 12 and the best support of accessories 10, it is contemplated for supporting straps 4 to be adjusted so that connecting rings 6a and 6b, respectively, are each positioned near to the interface between the top and one side surface of computer monitor 12. If connecting rings 6a and 6b drop below the top surface of computer monitor 12 and the upper side surfaces of accessories 10 do not contact the sides computer monitor 12, accessories 10 will not be positioned in an efficient, space-saving vertical orientation flush against the side surfaces of computer monitor 12.

Figure 3:
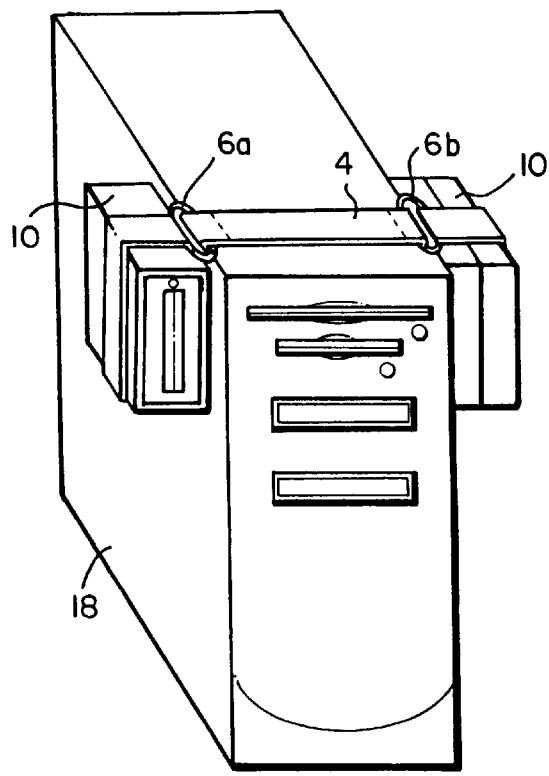
FIG. 3 is a perspective view of the present invention supporting three computer accessories, with one accessory secured within a loop provided on one end of the support strap and two accessories secured within a loop provided on the other end of the support strap, and the strap positioned across the top surface of a CPU tower housing.

FIG. 3 shows computer accessory mounting device 10 in use, supported across the top of a CPU tower housing 18. FIG. 3 shows one accessory 10, such as an external drive, suspended on one side of CPU tower housing 18, while two accessories 10, such as back-up tapes, are suspended on the other side of CPU tower housing 18. FIG. 3 further shows connecting rings 6a and 6b in their preferred positions near to the interface of the top and sides of CPU tower housing 18 so that accessories 10 will hang in an efficient, near vertical position.

Figure 4:
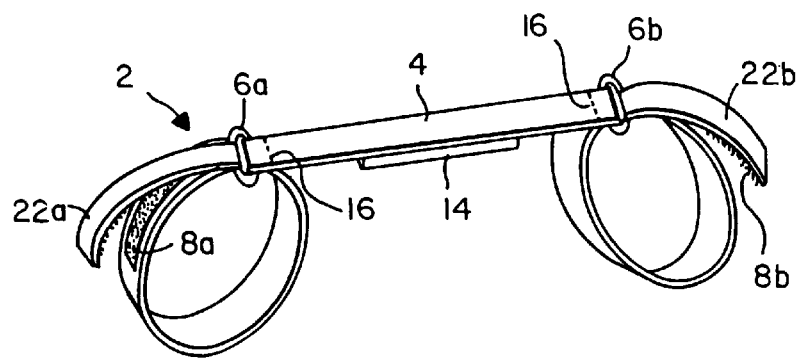
FIG. 4 is a perspective view of the present invention prior to use.

FIG. 4 shows computer accessory mounting device 10 ready for use. Connecting rings 6a and 6b allow loops to be made in both end portions of support strap 4 for use in securely holding one or more accessories 10. FIG. 4 also shows fasteners 8a and 8b positioned for securing the flap "extensions 22a and 22b, respectively". Of support strap 4 to the outside surface of one of the support strap 4 loops. In addition, FIG. 4 shows a pad 14 centrally attached to the surface of support strap 4 to be in contact with computer monitor 12, to prevent support strap 4 from slipping when the top surface of computer monitor 12 inclines rearwardly or when the suspended accessories 10 are not completely balanced in weight. It is contemplated for pad 14 to be made from a high friction material, however, the means for attaching pad 14 to support strap 4 and its size are not critical. Although not limited thereto, pad 14 could be attached to support strap 4 with stitching 16, chemical bonding agents (not shown), or freely supported against the top surface of computer monitor 4 by the weight of accessories 10 pulling downward on the center portion of support strap 4. FIG. 4 also shows stitching 16 across the width of support strap 4 centrally from both connecting ring 6a and connecting ring 6b. Although its use is not critical, stitching 16 maintains connecting rings 6a and 6b in fixed positions to minimize the amount of handling required for installation of accessories within the loops of support strap 4.

Figure 5:
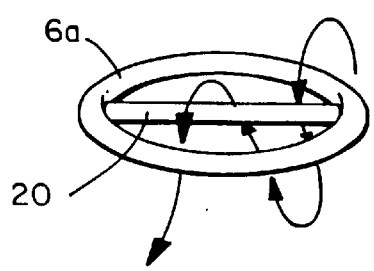
FIG. 5 is a top view of a first preferred embodiment of the connecting ring of the present invention having a centrally located cross bar to form two central openings through which a support strap can be inserted and arrows to show the direction of strap insertion.
Figure 6:
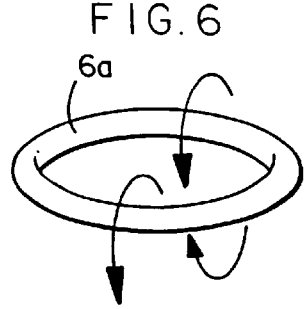
FIG. 6 is a top view of a second preferred embodiment of the connecting ring of the present invention having one central opening through which a support strap can be twice inserted and arrows to show the direction of strap insertion.

Although FIGS. 5 and 6 show two preferred embodiments of a connecting ring identified as 6a, the configurations presented are contemplated for both connecting ring 6a and 6b. FIG. 5 shows connecting ring 6a having a lengthwise cross bar 20 to form two central openings therethrough, with arrows showing the direction of insertion of the end flap of support strap 4 during use. FIG. 6 shows connecting ring 6a having one central opening therethrough, with arrows showing the direction of insertion of the end flap of support strap 4 during use. Although connecting rings 6a and 6b could be round or oval in configuration, in the most preferred embodiment it is contemplated for connecting rings 6a and 6b to be more elongated and rectangular in shape for a more streamlined appearance. In the most preferred embodiment of the present invention, it is also contemplated for connecting rings 6a and 6b to have a somewhat flattened height dimension.

To use computer accessory mounting device 2, one would first insert a first end of support strap 4 twice through connecting ring 6a to form a loop and place a first accessory 10 within the loop. Fastener 8a would then be engaged between the first end of support strap 4 and the remainder of support strap 4 to tightly secure a first accessory 10 within support strap 4. The second end of support strap 4 would then be made to encircle a second computer accessory 10 and feed twice through a second connecting ring 6b. Second fastener 8b would then be engaged between the second end of support strap 4 and the remainder of support strap 4 to tightly secure second accessory 10 within support strap 4. Once accessories 10 are secured within computer accessory mounting device 2, the center portion of support strap 4 is placed across the forward top surface of computer monitor 12. The sound quality of audio speakers so placed is enhanced, being in a more direct line with a computer operator's ear (not shown). If connecting rings 6a and 6b are not positioned near the interface of the top and side surfaces of computer monitor 12, to allow both accessories 10 to rest flat against the side of computer monitor 12, one end of support strap 4 would be released and re-engaged to adjust the loop around accessories 10 so accessories rest in a substantially vertical position flush against the upper side surfaces of computer monitor 12. To remove accessories 10 from the present invention, one would simply lift computer accessory mounting device 2, with accessories 10 attached thereto, from the top surface of monitor 12, disengage first fastener 8a, and remove first accessory 10 from the first loop in support strap 4. Then one would similarly disengage second fastener 8b and remove second accessory 10 from the second loop in support strap 4 to make the present invention ready for storage, or available for reuse at another computer location. Neither the housing of computer monitor 12, nor CPU tower 18, would be permanently altered or affected by use of the present invention.

What is claimed is:

1. A mounting device for suspending at least one external computer accessory against each opposed upper side surface of the type of housing used for computer monitors and CPU towers for the purpose of reducing desktop clutter of computer operators so as to enhance their work efficiency, the housing selected for use in mounting computer accessories having an essentially horizontal top surface and each of the computer accessories selected for mounting having a top, a bottom, and opposing side surfaces which together form a perimeter, said device comprising an elongated, flexible, non-stretchable strap having a first end, a second end, and a lower surface, said strap also being made from material having a textured non-slipping surface, said strap further having a sufficient length dimension adapted to span the top surface of a housing selected for mounting computer accessories, encircle the perimeters of external computer accessories selected for mounting against the housing, and provide a first flap extension on said first end and a second flap extension on said second end, said flap extensions each having a minimum length dimension sufficient for tightly securing at least one of the selected computer accessories within said strap, said strap also having a sufficient width dimension for said strap to adequately support the selected computer accessories in a stable and essentially vertical position against the housing; said device also having two connecting members each configured with a cross bar centrally positioned thereacross to create two openings for insertion therethrough of said strap, each of said openings having a length dimension larger than said width dimension of said strap, said strap being twice inserted through at least one of said openings in each of said connecting members to form a loop into which at least one of the selected computer accessories is placed during mounting, each of said loops having an outside surface, when positioned on said strap during use said connecting members together defining a center portion of said strap having a length dimension adapted to be substantially equivalent to the width dimension of the top surface of the housing; said device further having at least one fastener attached to each of said flap extensions for securing each of said flap extensions to said outside surface of the one of said loops adjacent thereto, and attachment means to securely affix said fasteners to said strap so that when at least one of the selected computer accessories is placed into each of said loops and securely tightened therewithin, and said center portion of said strap is placed upon the top surface of the housing the selected computer accessories become suspended above the desktop surface of a computer operator while remaining in a position readily available to said computer operator for immediate use.

2. The device of claim 1 further comprising a pad made from high friction material, said pad being attached centrally to said lower surface of said strap.

3. The device of claim 1 wherein said strap comprises polypropylene webbing.

4. The device of claim 1 wherein said fasteners each comprise at least two hook-and-loop type of fasteners.

5. The device of claim 4 wherein said hook-aid-loop type of fasteners each have a width dimension only negligibly less than the width dimension of said strap.

6. The device of claim 4 wherein said attachment means comprises stitching.

7. A mounting device for suspending at least one external computer accessory against each opposed upper side surface of the type of housing used for computer monitors and CPU towers for the purpose of reducing desktop clutter of computer operators so as to enhance their work efficiency, the housing selected for use in mounting computer accessories having an essentially horizontal top surface and each of the computer accessories selected for mounting having a top, a bottom, and opposing side surfaces which together form a perimeter, said device comprising an elongated, flexible, non-stretchable strap having a first end, a second end, and a lower surface, said strap also being made from material having a textured non-slipping surface, said strap further having a sufficient length dimension adapted to span the top surface of a housing selected for use in mounting computer accessories, encircle the perimeters of external computer accessories selected for mounting against the housing, and provide a first flap extension on said first end and a second flap extension on said second end, said flap extensions each having a minimum length dimension sufficient for tightly securing at least one of the selected computer accessories within said strap, said strap also having a sufficient width dimension for said strap to adequately support the selected computer accessories in a stable and essentially vertical position against the housing; said device also having two connecting members each configured with a cross bar centrally positioned thereacross to create openings for insertion therethrough of said strap, each of said openings having a length dimension larger than said width dimension of said strap, said strap being twice inserted through at least one of said openings in each of said connecting members to form a loop into which at least one of the selected computer accessories is placed during mounting, each of said loops having an outside surface, when positioned on said strap during use said connecting members together defining a center portion of said strap having a length dimension adapted substantially equivalent to the width dimension of the top surface of the housing, said connecting members also each having an outer edge; a quantity of stitching laterally on said center portion of said strap approximately one-half of an inch from said outer edge of each of said connecting members, said quantity of stitching extending across said width dimension of said strap to bind two layers of said strap together to attach each of said connecting members in a fixed position to said strap; said device further having at least one fastener attached to each of said flap extensions on said lower surface of said strap for securing each of said flap extensions to the one of said loops adjacent thereto, and wherein said fasteners each comprise at least one hook-and-loop type of fastener having a width dimension only negligibly less than the width dimension of said strap; and attachment means to securely affix said fasteners to said strap so that when at least one of the selected computer accessories is placed into each of said loops and securely tightened therewithin, and said central portion of said strap is placed upon said top surface of the housing, the selected computer accessories become suspended above the desktop surface of a computer operator while remaining in a position readily available to said computer operator for immediate use.

8. The device of claim 7 further comprising a pad made of high friction material, said pad being attached centrally to said lower surface of said strap.

9. The device of claim 7 wherein said strap comprises polypropylene webbing.

10. The device of claim 7 wherein said attachment means comprises stitching.

11. A method of mounting a plurality of external computer accessories by suspension from the top surface of the type of housing used for computer monitors and central processing unit towers, to keep the computer accessories selected for mounting in an out-of-the-way position while at the same time allowing them to be readily accessible for use, for the purpose of reducing the desktop clutter of computer operators so as to enhance their work efficiency, said method comprising the steps of providing an elongated, flexible, non-stretchable strap, two connecting members each having at least one central opening sufficient for insertion therethrough of said strap, a plurality of fasteners, attachment means, a plurality of computer accessories, and a computer housing having a substantially horizontal top surface; attaching said fasteners laterally to said strap near to its opposite ends with said attachment means; inserting a first end of said support strap twice through a first connecting member to form a first loop in said strap; selecting at least one of said accessories for mounting in said first loop; placing said first selected accessories within said first loop; pulling on said first end of said strap to tighten said first loop around said first selected accessories; engaging said fasteners on said first end to secure said first end to the outside surface of said first loop to tightly secure said first selected accessories within said first loop; inserting the second end of said support strap twice through the second connecting member to form a second loop in said strap; selecting at least one of said accessories for mounting in said second loop; placing said second selected accessories within said second loop; pulling on said second end of said strap to tighten said second loop around said second selected accessories; engaging said fasteners on said second end to secure said second end to the outside surface of said second loop to tightly secure said second selected accessories within said second loop; placing the center portion of said strap, defined by said connecting members, across said top surface of said computer housing so that each of said connecting members is positioned near to one of said opposed edges of said top surface and said first selected and said second selected accessories are suspended in an essentially vertical position substantially flush against the upper side surfaces of said computer housing; when necessary to align said connecting members with said opposed edges of said top surface, releasing said fastener on one of said ends of said strap, readjusting said loop around said accessories, and re-engaging said released fastener; and after use removing said first selected accessories and said second selected accessories from computer housing by simply lifting said center portion of said strap from said top surface of said computer housing, disengaging each of said fasteners, and removing said first selected accessories from said first loop and said second selected accessories from said second loop.

12. The method of claim 11 further comprising the steps of providing a pad made from high friction material and centrally attaching said pad to said lower surface of said center portion of said strap with said attachment means.

13. The method of claim 11 wherein said step of providing said strap further comprises the providing of a strap comprising polypropylene webbing.

14. The method of claim 11 wherein said step of providing said attachment means further comprises the providing of attachment means comprising stitching.

15. The method of claim 11 wherein said step of providing said connecting members further comprises the providing of connecting members comprising a cross bar centrally positioned thereacross to create two openings for insertion of said strap.

* * * * *